United States Patent [19]

Russell et al.

[11] Patent Number: 5,243,695
[45] Date of Patent: Sep. 7, 1993

[54] METHOD AND APPARATUS FOR GENERATING ANTI-ALIASED LINES ON A VIDEO DISPLAY

[75] Inventors: Jeffrey D. Russell; Steven C. Maher, both of Cedar Rapids, Iowa

[73] Assignee: Rockwell International Corporation, Seal Beach, Calif.

[21] Appl. No.: 529,039

[22] Filed: May 24, 1990

[51] Int. Cl.$^5$ .............................................. G06F 15/62
[52] U.S. Cl. .................................... 395/143; 395/141
[58] Field of Search ................................ 395/141-143

[56] References Cited

U.S. PATENT DOCUMENTS

| | | | |
|---|---|---|---|
| 4,873,515 | 10/1989 | Dickson et al. | 395/143 X |
| 4,908,780 | 3/1990 | Priem et al. | 340/728 X |
| 4,918,626 | 4/1990 | Watkins et al. | 340/728 X |

Primary Examiner—Gary V. Harkcom
Assistant Examiner—Almis Jankus
Attorney, Agent, or Firm—M. Lee Murrah; V. Lawrence Sewell; H. Fredrick Hamann

[57] ABSTRACT

Aliasing on a video display resulting from digital sampling and appearing as jagged lines and crawling movement is eliminated by controlling the intensity of video display pixels as a function of distance from the ideal line location. Intensity values are stored in an intensity lookup table as a function of two values. For the middle portion of a line, the two values are the shorter of the distance from a pixel in either the x-direction or y-direction and the smaller of the slope with respect to the x-axis or the y-axis. For line end points, the two values are the distances of the pixel from the end point in the x-direction and the y-direction.

2 Claims, 3 Drawing Sheets

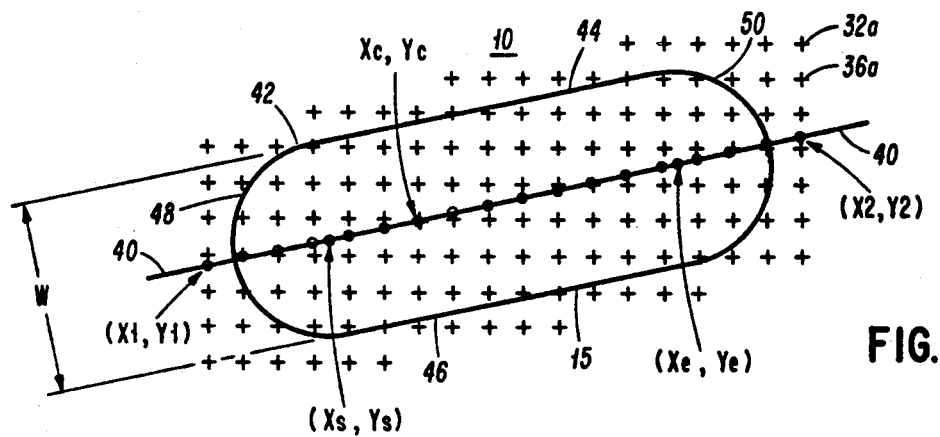
FIG. 4
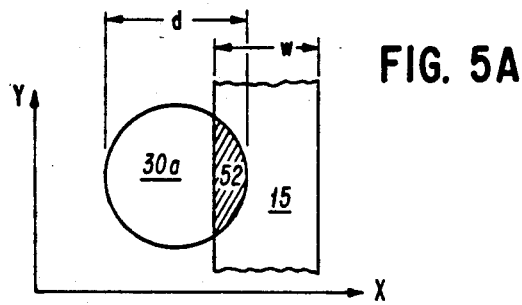
FIG. 5A
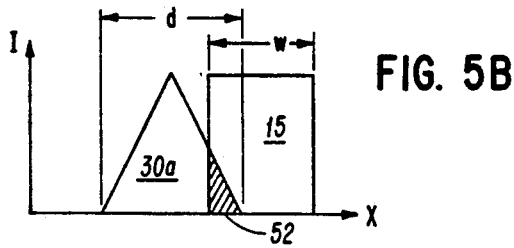
FIG. 5B
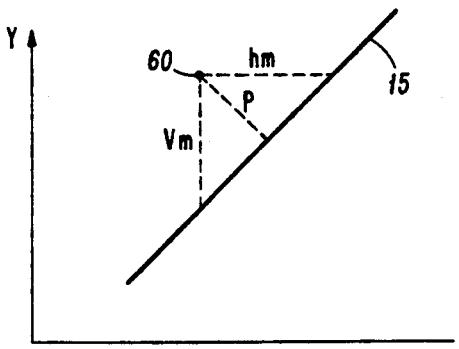
FIG. 6A
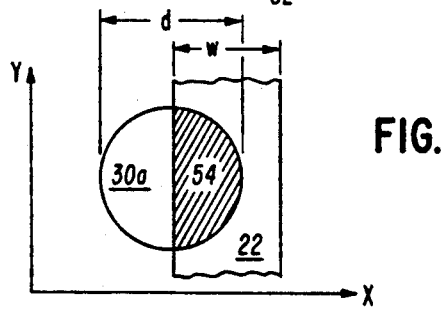
FIG. 5C
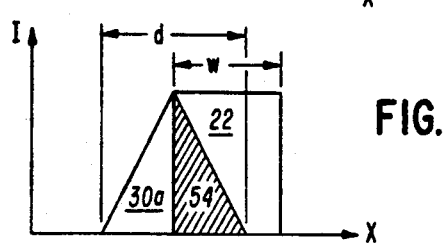
FIG. 5D
FIG. 6B
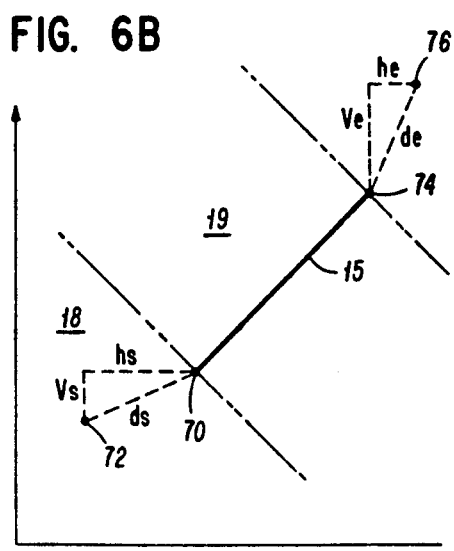

METHOD AND APPARATUS FOR GENERATING ANTI-ALIASED LINES ON A VIDEO DISPLAY

BACKGROUND OF THE INVENTION

The invention relates to new and useful improvements in video displays, and more particularly to video graphics displays, and most particularly to drawing lines on video graphics displays.

Video graphics displays of all types are usually organized on the display medium as two-dimensional arrays of discrete, uniformly-spaced picture elements known as pixels. Images are formed by illuminating selected pixels to one of several intensities in correspondence with a value stored in a digital memory known as a frame buffer. Typical of such displays are active-matrix liquid crystal display (LCD) panels. On such displays, pixels are centered on integer screen x-y coordinates ("centered" arrangement) or are offset in the x-direction in every other row typically by one-half unit ("triad" or "delta" arrangement).

Graphics images are formed by combining several basic shapes such as straight lines and arcs, which are known as "primitives". As used in connection with the present invention, it is intended that the term "line" mean all types of open primitives having two ends and a middle, regardless of whether the middle is straight or curved. Closed shapes, such as circles, can be viewed as compound shapes comprised of two or more curved or straight lines.

When drawn on displays using discrete pixels, lines suffer from a condition known as "aliasing". Aliasing affects all lines, but it is most easily understood in relation to straight lines. The present application describes the invention as applied to straight lines, but it should be understood that the same principles are applicable to other types of lines, whether in singular or compound form. While display pixels are centered at discrete intervals, lines usually pass between pixels or somewhere in the pixel other than the exact center. Instead of line segments having the desired smooth, continuous appearance, aliasing results in line segments which have jagged, "stairstepped" edges. In dynamic displays aliasing also results in distracting jumpy, crawling movement.

It is known in the art that aliasing can be alleviated by proper use of pixel intensity. Modulation of pixel intensity along a line permits a line to appear to be positioned between pixel centers. This produces static displays having lines and shapes with a smooth, pleasing appearance which does not vary with angular orientation. Line end points may be formed as semicircular appendages to both ends of the line having a radius of one-half the line width and centered at the exact end point. This eliminates gaps and other anomalies at the corners of symbols constructed of several connected line segments since the end of one line coincides exactly with the beginning on another. In dynamic displays, this provides images having smooth, natural movement.

This process is exemplified by Gupta and Sproull, "Filter Edges for Gray-Scale Displays", *Computer Graphics*, August 1981, pages 1-5, and U.S. Pat. No. 4,612,540 to Pratt, both of which are incorporated herein by reference. These references accomplish anti-aliasing by employing the perpendicular distance from the center of a pixel to the center of the line as an index of a look-up table of pre-computed intensity values. The look up table entries define the cross-sectional intensity profile of the line computed by convolving a low-pass filter function with an ideal line function, which comprises a rectangular profile of some desired width. Both references also teach that endpoints must be treated as special cases, but neither gives due consideration to generation of semicircular end points.

Use of perpendicular distance as disclosed by the prior art is disadvantageous due to arithmetic and hardware complexity required for its calculation. Calculation is required for every pixel in the region along the line segment to be generated and in regions surrounding both end points. This wastes large amounts of valuable time and in dynamic displays degrades the realism of the displayed image. The difficulty can be further exacerbated by the particular arrangement of pixels employed by LCD media, which, unlike CRT's, need not be in a convenient rectilinear array.

It is therefore an object of the present invention to provide an improved method of forming graphics primitives on a video display which does not require explicit calculation of perpendicular distance for evaluation of pixel intensity.

It is another object of the present invention to provide an improved method of forming graphics primitives on a video display which requires less hardware than prior art methods.

It is a further object of the present invention to provide an improved method of forming graphics primitives on a video display which is faster than prior art methods.

It is yet another object of the present invention to provide an improved method of forming lines on a graphics display which has semicircular end points of similar cross-sectional intensity profile as that employed along the line.

SUMMARY OF THE INVENTION

With these and other objects in view, the present invention overcomes aliasing of a line, for example, on a graphics video display by determining the distance of a pixel from the center of a line and displaying the pixel in varying intensities depending upon the distance of the pixel from the line. Instead of calculating perpendicular distances, the present invention produces indexes which are used to address a lookup table of intensity values. Values in the table are provided in at least two sections, a first for pixels in the middle region of the line and a second for pixels in the end sections of the line.

For pixels in the middle region, both the vertical and horizontal distance in an orthogonal coordinate system, between the pixel and the line are calculated. In addition, it is determined whether the line is steep or shallow, and the smaller of the slope either in the vertical or horizontal dimension is determined such that the result is between 0 and 1. The shorter of the horizontal or vertical distance and the smaller slope are used as indices to the lookup table.

For pixels in the end regions, the horizontal and vertical distances between the pixel and the line end are calculated, and the results are used as the second set of indices to the lookup table.

Depending upon whether a pixel is in the middle or an end section of the line, a different section of the lookup table is used.

BRIEF DESCRIPTION OF THE DRAWINGS

The invention may be more fully understood by reading the following description of a preferred embodiment of the invention in conjunction with the appended drawings wherein:

FIG. 4 is a diagram of the geometry of a typical line as formed on a display medium of the type shown in FIG. 3A;

FIGS. 5A and 5C are plan views of the intersection of a pixel and a line in the spatial domain showing two different degrees of intersection;

FIGS. 5B and 5D are graphical representations in elevational view of the intersection of the pixel and line of FIGS. 2A and 2C in the light intensity domain, showing the respective degrees of intersection as shown in FIGS. 2A and 2C;

FIGS. 6A and 6B are geometrical representations of the theory of the present invention as applied to pixels in the middle of a line and at the end of a line, respectively.

DETAILED DESCRIPTION OF A PREFERRED EMBODIMENT

Figure 1:
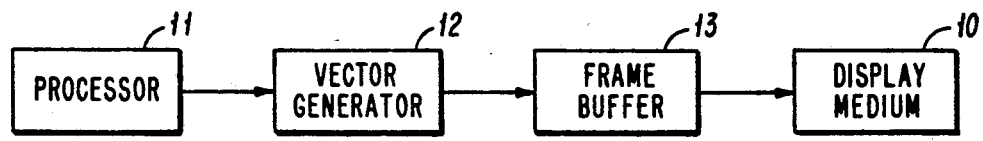
FIG. 1 is a block diagram of a video display system, including a display medium, in which the present invention may be utilized.

The invention may be embodied in a display system of the type shown in FIG. 1. The system uses a digitally controlled discrete display medium 10 having an array of pixels, each of which is capable of several intensities of gray to provide a visual portrayal of an image. Display medium 10 may be of any suitable type, including LCD panels and raster scan cathode ray tube (CRT). While display medium 10 is described as a monochrome display which displays shades of gray, the same principles apply to a color display, and such displays are explicitly included within the scope of the invention.

The content of the image on display medium 10 is determined by a data processor 11, which may comprise a digital computer, or the like. The output of processor 11, which may, for example, comprise a plurality of straight line segments, is coupled to a vector generator 12 which calculates pixel intensity values for each line segment. Intensity calculations are performed for all pixels in the domain surrounding the defined line segment so as to achieve an anti-aliased rendition with semicircular end points. The output of vector generator 12 is coupled to a frame buffer 13, which comprises a bank of memory having an addressable memory location for each pixel, and which stores the pixel intensity values calculated by vector generator 12. The output of frame buffer 13 is coupled to display medium 10, and frame buffer 13 periodically refreshes display medium 10.

Figure 2:
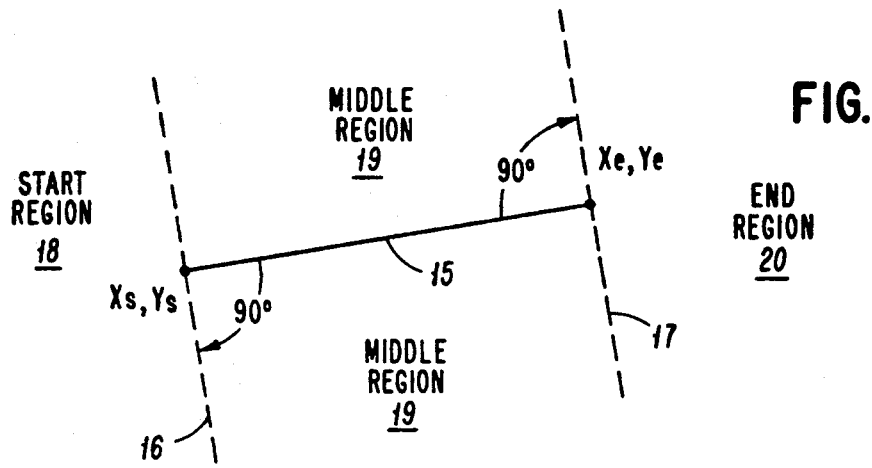
FIG. 2 is a diagram of the geometry of a typical line showing regions relating to the theory of the invention.

As shown in FIG. 2, vector generator 12 may generate a line 15 having a starting coordinate $(X_s, Y_s)$ in an orthogonal coordinate system, and an ending coordinate $(X_e, Y_e)$. Line 15 may be divided into three regions as defined by boundary lines 16 and 17, which are drawn through endpoint coordinates $(X_s, Y_s)$ and $(X_e, Y_e)$ at 90 degrees to line 15, thus forming a start region 18, a middle region 19, and an end region 20. Line 15 may either be a shallow line defined as one in which $|X_e - X_s|$ is greater than or equal to $|Y_e - Y_s|$ or a steep line defined as one in which $|X_e - X_s|$ is less than $|Y_e - Y_s|$. In the case of a shallow line, the equation of boundary line 16 is:

$$x = -m * (y - Y_s) + X_s \tag{1}$$

Equation (1) may be recast as a function f as follows:

$$f = m * (y - Y_s) + (x - X_s) \tag{2}$$

where $f = 0$ defines the boundary line between start region 18 and middle region 19. By the principles of analytical geometry, the condition $f < 0$ occurs only when $(x, y)$ is in start region 18. Therefore, testing the sign of f is sufficient to locate a coordinate as being on one side or the other of boundary line 16. A similar function g as follows:

$$g = m * (y - Y_e) + (x - X_e) \tag{3}$$

may be employed in like manner with respect to boundary line 17. For steep lines, equations (2) and (3) are written as follows:

$$f = m * (x - Y_s) + (y - Y_s) \tag{4}$$

and $$g = m * (x - X_e) + (y - Y_e) \tag{5}$$

Figure 3A:
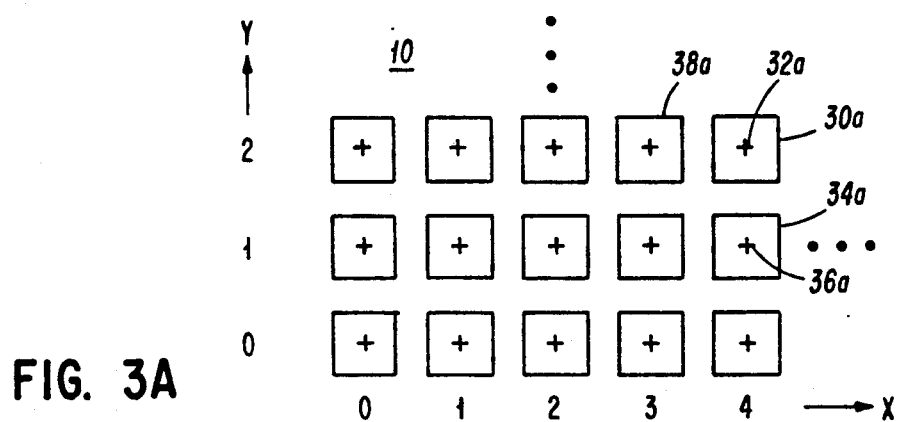
FIG. 3A and 3B are greatly magnified portions of the display medium of FIG. 1, showing respectively a centered pixel arrangement and a delta pixel arrangement.
Figure 3B:
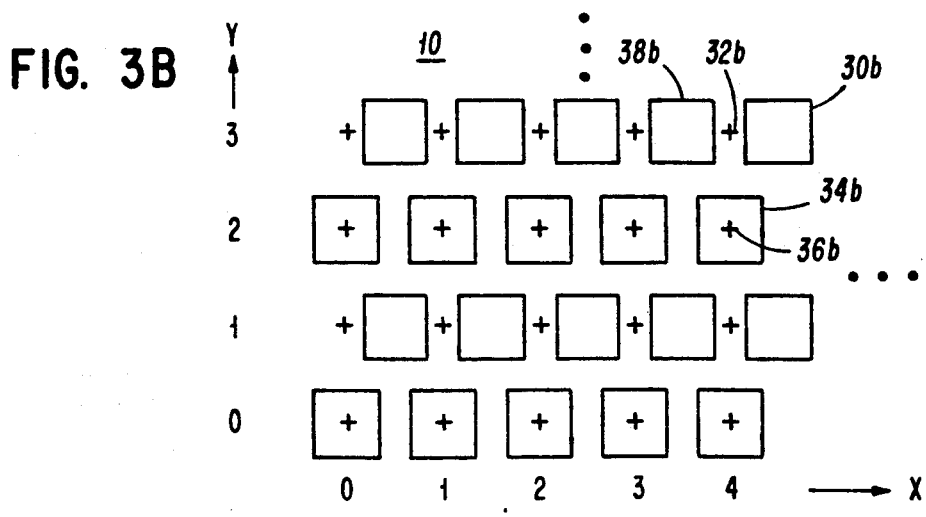

Aliasing occurs due to the use of a display medium 10 which uses discrete display elements. FIGS. 3A and 3B, show two typical arrangements of discrete pixels on display medium 10. FIG. 3A shows a centered configuration of pixels such as 30a and 64a each having an associated x-location as measured along the horizontal x-axis and an associated y-location as measured along the vertical y-axis, the combination forming integer $(x,y)$ coordinate locations such as 32a and 36a. Each such pixel location has an associated memory location in frame buffer 13. In the centered configuration, the x-y coordinate locations such as 32a and 36a all fall at the centers of pixels such as 30a and 34a. FIG. 3B shows a display using a delta arrangement of pixels such as 30b and 34b. In the particular arrangement shown, every other row of pixels is offset by ½ coordinate span such that $(x,y)$ coordinate location 36b, for example, falls in the center of its associated pixel, and $(x,y)$ coordinate location 32b falls halfway between 32b and 38b, for example.

Aliasing occurs because the points on a line do not always fall directly on a pixel when drawn on display medium 10. FIG. 4 shows a typical line 15 drawn on a display medium 10 having a multiplicity of pixels whose centers are represented by crosses such as 32a and 36a as described in connection with FIGS. 3A and 3B. Line 15, which has a width w is symmetrical about a center line 40, forming a line domain 42 of generally parallel sides 44 and 46 and semicircular ends 48 and 50. Center line 50 has a starting point at coordinate $(Y_s, Y_s)$, an ending point at coordinate $(X_e, Y_e)$, and extended end point coordinates $(X_1, Y_1)$ located outwardly from $(X_s, Y_s)$ and $(X_2, Y_2)$ located outwardly from $(X_e, Y_e)$. Center line 40 contains points $(X_c, Y_c)$ calculated by vector generator 12. As may be readily observed some pixels are completely inside line domain 48, while others fall at various distances from sides 44 and 46.

Referring to FIGS. 5A-5D, the basic theory of the use of pixel intensity to prevent aliasing is shown. A pixel 30a having diameter d, and a line 15 having a width w are shown in two different degrees of intersection in FIGS. 5A/5B and 5C/5D, respectively. In FIG. 5A pixel 30a and line 15 intersect to form an overlap area 52. In FIG. 5B the extent to which the degree of intersection between pixel 30a and line 15 affects intensity is shown. Pixel intensity is usually modelled as a cone 30a (isosceles triangle in cross-section as shown in FIG. 5B). The intensity necessary to depict the partial intersection of pixel 30a and line 15 is represented by the volume of region 52 subtended by line 15 within the cone formed by pixel 30a in the intensity domain. When there is a greater degree of intersection between pixel 30a and line 15 as shown in FIG. 5C, a larger overlap area 54 is created. Likewise, the volume subtended by line 15 within the intensity cone of pixel 30a is proportionately larger as shown by region 54 in FIG. 5D.

The theory of the present invention as applied to middle region 19 of line 15 is illustrated in geometrical form in FIG. 6A. A line 15 in an x-y coordinate system passes near a pixel 60 and is separated from pixel 60 by a perpendicular distance p. The prior art method explicitly calculated distance p and then used a lookup table to derive an appropriate pixel intensity for distance p. The calculation of distance p requires mathematical operations such as deriving a square root which requires considerable computer code and thus introduces considerable delay. The present invention determines the horizontal distance $h_m$ between line 15 and pixel 60 and the vertical distance $v_m$ and determines the slope $M_x$ with respect to the x-axis and $M_y$ with respect to the y-axis from the ratio of $h_m$ and $v_m$ and the inverse thereof, respectively. The smaller of distances $h_m$ or $v_m$, designated $d_m$, and the smaller of slopes $M_x$ and $M_y$, designated M, are selected, and these two variables are used to address a lookup table of intensity values. From the principles of trigonometry, it may be seen that specifying slope of line 15 and the horizontal or vertical distance between line 15 and pixel 60 indirectly provides that same result as specifying p alone.

A similar theory as applied to the end of a line such as in start region 18 is illustrated in FIG. 6A. Line 15 ends at point 70 near a pixel 72. The intensity of pixel 72 depends upon the direct distance d between pixel 72 and end point 70. By the principles of analytical geometry the distance $d_s$ is equal to the square root of the sum of the squares of the vertical distance $v_s$ and the horizontal distance $h_s$ in an orthogonal coordinate system. However, instead of explicitly calculating distance d, the present invention determines $v_s$ and $h_s$ and uses a lookup table, which implicity uses the distance d, to determine an intensity level. Similar reasoning applies to calculation of a vertical distance $v_e$ and a horizontal distance $h_e$ of a pixel 76 in end region 20 near line end 74.

Figure 7:
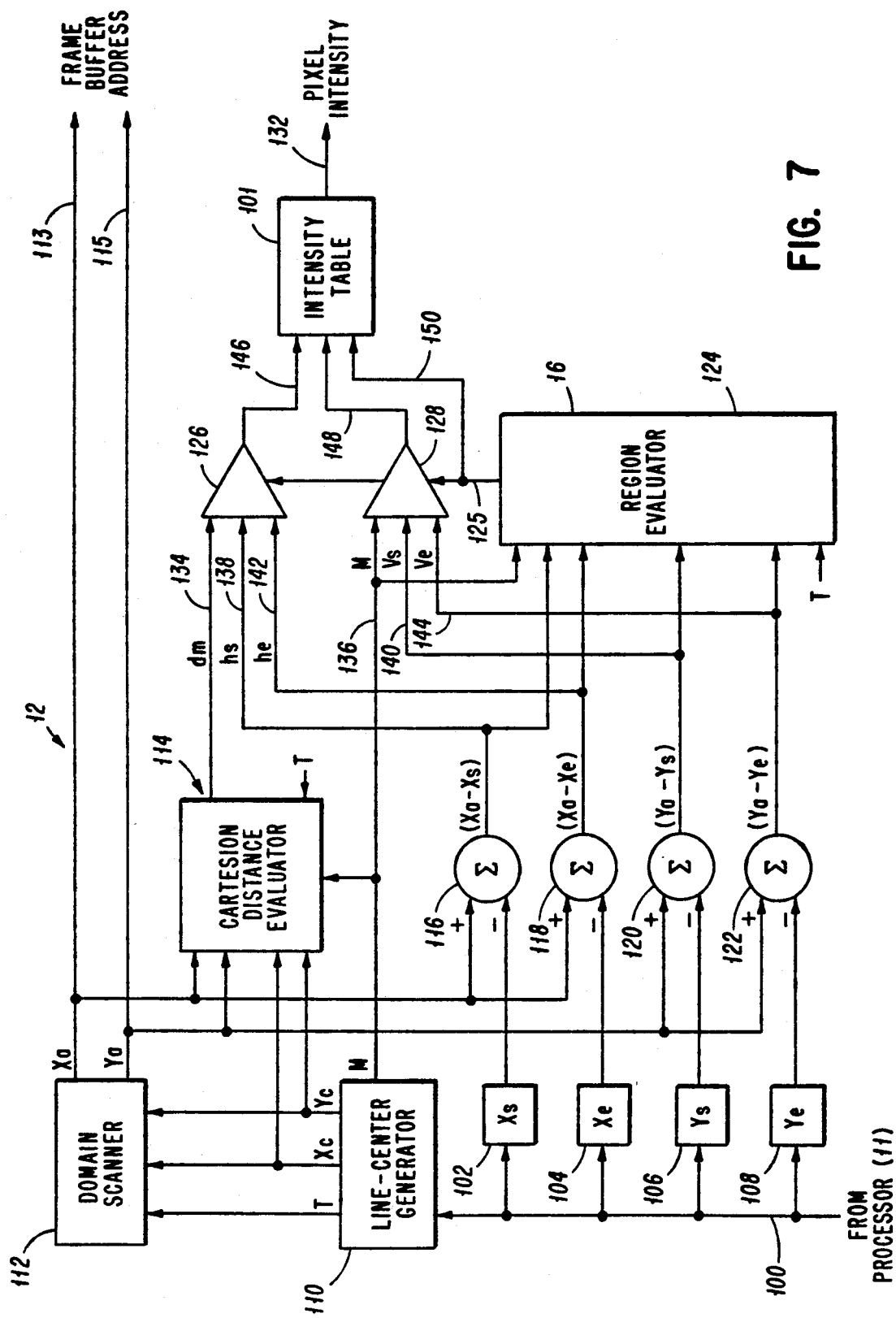
FIG. 7 is a detailed schematic diagram of the vector generator shown in FIG. 1.

The present invention may be implemented in the detailed apparatus depicted in FIG. 7. Information from processor 11 on line 100 is used in the apparatus of FIG. 7 to define a desired line by producing a multiplicity of frame buffer address $(X_a,Y_a)$ on lines 113 and 115 and a pixel intensity for each address on line 132. The intensity of each pixel at addresses $(X_a,Y_a)$ is determined by processing the information on line 100 with the apparatus shown in FIG. 7 to define a pair of indices which are used to address an intensity lookup table 101. Since intensity lookup table 101 must accommodate pixels in both midline region 19 and in the end-of-line regions 18 and 20, intensity table 101 is segmented into two identifiable sections. The first table section uses the slope M and the shorter of the distances $h_m$ and $v_m$ (FIG. 6A) as indices to address the values in the table for pixels in midline region 19. The second table section uses $h_e$ and $v_e$ as indices to address the values in the table for pixels in either of the end regions 18 or 20.

Turning to the details of the way the invention is carried out, processor 11 (FIG. 1) is coupled to vector generator generally designated by the numeral 12 via line 100 as detailed in FIG. 7. Processor 11 generates the starting coordinate $(X_s,Y_s)$ and end coordinate $(X_e,Y_e)$ of a line such as 15 (FIG. 2) and loads $X_s$ into register 102, $X_e$ into register 104, $Y_s$ into register 106, and $Y_e$ into register 108. In the general case, these coordinates are not integer values but include fractional bits to accommodate subpixel positioning. Typically, three such bits are sufficient to achieve proper anti-aliasing and smooth motion. The specification of the ideal line is also loaded by processor 11 into line center generator 110 via line 100. Line center generator 110 provides a line type output T which classifies the specified line as shallow or steep in accordance with the formulas as previously defined in connection with FIG. 2.

Based upon the determination of line type, line center generator 110 calculates a slope m as either:

$$m=(Y_e-Y_s)/(X_e-X_s) \quad (6)$$

for shallow lines, and $$m=(X_e-X_s)/(Y_e-Y_s) \quad (7)$$

for steep lines. By performing the calculations in this manner, the slope is always limited in magnitude by the range 0 to 1. Line center generator 110 outputs as M the most significant bits of slope m. The number of significant bits is typically 4 plus a sign bit to provide sufficient accuracy in subsequent calculations.

Line center generator 110 outputs a multiplicity of coordinates $(X_c,Y_c)$ defining points along the center of the specified line 15 in middle region 19 (see FIG. 2). Any one of several methods may be used for such display generation. For shallow lines $X_c$ is treated as the independent variable and $Y_c$ as the dependent variable, and for steep lines the converse applies. As commonly employed, the independent variable takes on only whole integer values and changes by one whole unit in each step of the generator process. Correspondingly, the dependent variable generally includes a fractional part and changes by the value of m in each generation step.

Referring more specifically to the shallow line example of FIG. 4, processor 11 initializes line center generator 110 with extended end point coordinates $(X_1,Y_1)$ and $(X_2,Y_2)$ as shown in FIG. 4. The extended end point coordinates are calculated such that the length of each extension is at least one-half the prescribed width of the desired line rendition. Line center generator 110 then outputs in succession the aforementioned values $(X_c,Y_c)$ along the line center which are shown as small open circles along center line 40 in FIG. 4.

The values T, $X_c$ and $Y_c$ are coupled to a domain scanner 112 which uses each value $(X_c,Y_c)$ to calculate a series of frame buffer address $(X_a,Y_a)$ which depend upon the value of line type signal T. In general, domain scanner 112 comprises a counter which takes the integer portion of each line center value $(X_c, Y_c)$ and counts using the $Y_c$ value for shallow lines and the $X_c$ value for steep lines. The counter begins at a count of N on one side of line 50 and counts until it reaches a count of N on the other side of line 50. N is a value which is the smallest integer not less than $\sqrt{2}$ * (one-half the prescribed line width). For shallow lines each line center coordinate $(X_c, Y_c)$ produces a vertical scanning sequence having addresses ranging from $(X_c, Y_c-N)$ to $(X_c, Y_c+N)$. Similarly, for steep lines each line center coordinate $(X_c, Y_c)$ produces a horizontal scanning sequence ranging from $(X_c-N, Y_c)$ to $(X_c+N, Y_c)$. The sequences thus produced encompass every pixel within the domain 42 of the line rendition, which corresponds to a distance of one half the prescribed line width from center line 40.

With the frame buffer addresses calculated, all that remains is to calculate a pixel intensity value for each pixel corresponding to each frame buffer address $(X_a, Y_a)$. This is the function of the remaining blocks shown in FIG. 7. The required calculation depends upon the particular arrangement of pixels employed by the display medium 10, two of which arrangements were described above in connection with FIGS. 3A and 3B. For purposes of the remaining description, however, the centered arrangement of FIG. 3A will be assumed. As is obvious to those skilled in the art, the delta arrangement of FIG. 2B could be substituted by the simple expedient of substituting $X_a + \frac{1}{2}$ wherever $X_a$ would otherwise be used.

The $X_c$ and $Y_c$ outputs of line center generator 110, the $X_a$ and $Y_a$ outputs of domain scanner 112, and the line type variable T are coupled to a Cartesian distance evaluator 114, which determines the distance from the pixel center corresponding to $(X_a, Y_a)$ to the center of the line. This distance is measured vertically for shallow lines and horizontally for steep lines. The general form of the evaluation function used be Cartesian distance evaluator 114 for shallow lines is:

$$M * (X_a - X_c) + (Y_a - Y_c) \quad (8)$$

and for steep lines:

$$M * (Y_a - Y_c) + (X_a - X_c) \quad (9)$$

However, from the description of domain scanner 112, $X_a = X_c$ for shallow lines and $Y_a = Y_c$ for steep lines. Thus, the evaluation function reduces for shallow lines to:

$$Y_a - Y_c \quad (10)$$

and for steep lines to:

$$X_a - X_c \quad (11)$$

These measures are appropriate for use along the extent of the line in center region 19. In the start and end regions 18 and 20 near the endpoints, however, a different measure is required. For these regions, subtractors 116, 118, 120, and 122 in conjunction with region evaluator 124 make the required determination. For a pixel 72 in start region 18, the plus (+) input of subtractor 116 is coupled to the $X_a$ output of domain scanner 112, and the minus (−) input to $X_s$ register 102 to produce the horizontal distance between pixel 72 and end of line 70 at the end of line 15 as follows:

$$h_s = X_a - X_s \quad (12)$$

and the result is coupled to region evaluator 124 and a multiplexer 126. Further, the plus (+) input of subtractor 120 is coupled to the $Y_a$ output of domain scanner 112, and the minus (−) input to $Y_s$ register 106 to produce the vertical distance between pixel 72 and end of line 7 as follows:

$$v_s = Y_a - Y_s \quad (13)$$

and the result is coupled to region evaluator 124 and a multiplexer 128.

For a pixel 76 in end region 20, the plus (+) input of subtractor 118 is coupled to the $X_a$ output of domain scanner 112, and the minus (−) input to $X_e$ register 104 to produce the horizontal distance between pixel 76 and line end 74 as follows:

$$h_e = X_a - X_e \quad (14)$$

and the result is coupled to region evaluator 124 and multiplexer 126. Finally, the plus (+) input of subtractor 122 is coupled to the $Y_a$ output of domain scanner 112 and the minus (−) input to $Y_e$ register 108 to generate the vertical distance between pixel 76 and line end 74 as follows:

$$v_e = Y_a - Y_e \quad (15)$$

and the result is coupled to region evaluator 124 and multiplexer 128.

The input of region evaluator 124 is also coupled to the slope output M of line center generator 110 and the line type variable T. From slope M, the line type T, the difference $X_a - X_s$ from subtractor 116, the difference $Y_a - Y_s$ from subtractor 120, the difference $X_a - X_e$ from subtractor 118, and the difference $Y_a - Y_e$ from subtractor 122, region evaluator 124 evaluates the functions f and g for shallow lines as follows:

$$f = M * (Y_a - Y_s) + (X_a - X_s) \quad (16)$$

and $$g = M * (Y_a - Y_e) + (X_a - X_e) \quad (17)$$

and for steep lines as follows:

$$f = M * (X_a - X_s) + (Y_a - Y_s) \quad (18)$$

and $$g = M * (X_a - X_e) + (Y_a - Y_e) \quad (19)$$

The sign of the evaluated functions become two output lines 125 from region evaluator 124 indicative of whether $(X_a, Y_a)$ lies in start region 18, middle region 19, or end region 20. In particular, f<0 indicates start region 18, g>0 end region 20, and otherwise middle region 19.

In addition to the outputs from subtractors 116 and 118, the input of multiplexer 126 is also coupled to the output of Cartesian distance evaluator 114. The control ports of multiplexers 126 and 128 are coupled to the output lines 125 of region evaluator 124. One of the three values on input lines 134, 138, and 142 of multiplexer 126 is passed via line 146 as the first intensity index necessary to access values in intensity lookup table 101, depending upon the line region determined by region evaluator 124. Simultaneously, one of the values on input lines 136, 140, and 144 is passed via line 148 as the second intensity index necessary to access table 101, again depending upon the line region outputted by region evaluator 124.

The outputs from multiplexers 126 and 128 are used to address intensity table 101. Intensity table 101 also receives inputs from the two region-result outputs from region evaluator 124 via line 150 which permits the proper section of intensity table 101 to be addressed. When a point is in middle region 19, multiplexers 126 and 128 pass the Cartesian distance on line 134 and the slope M on line 136 to intensity table 101. The region signal on line 125 causes intensity table 101 to be addressed in the section holding values for midline region 19. When a point is in the start region 18 as determined by region evaluator 124, multiplexers 126 and 128 pass the distances $h_s$ and $v_s$ to intensity table 101. Likewise, when a point is in end region 20, multiplexers 126 and 128 pass the distances $h_e$ and $v_e$ to intensity table 126.

This input information is sufficient to determine the appropriate intensity of the current pixel to the accuracy required for anti-aliasing. Implicit in the table is use of the shortest distance from the current pixel center to the line segment as the basis for choosing an intensity defined by some desired profile. Denoting the output of multiplexer 126 as A and that of multiplexer 128 as B, the implicit distance functions are $\sqrt{(A*A+B*B)}$ in start region 18 and end region 40 and $|A|/\sqrt{(B*B=1)}$ in middle region 19. The intensity profile is computed by convolving a selected low pass filter function with a rectangular line function of the prescribed width and sampling the result to a precision corresponding to the precision of the input index of the table as described in connection with FIGS. 5A–5D.

Thus, table 101 contains an intensity value that is precomputed for all possible input combinations. The output of intensity table 101 becomes the value stored in the frame buffer at the current pixel location $(X_a, Y_a)$. Intensity table 101 can be realized with a single standard EPROM device. Typically, the output of intensity table 19 will be encoded in 3 or 4 bits, corresponding to either 8 or 16 levels of intensity. Lines are narrow, having widths typically less than 8 pixels. In accordance with the operation of domain scanner 112, the value of $(X_a, Y_a)$ is never much farther than one-half the prescribed width from $(X_c, Y_c)$, thereby limiting the range of values output by evaluator 114. When in start region 18 the values of $X_a - X_s$ and $Y_a - Y_s$ are limited to a like range. Similarly, the values of $X_a - X_e$ and $Y_a - Y_e$ are limited when in end region 40. As a result, each of multiplexers 126 and 128 need only provide a limited number of bits to properly index intensity table 101.

The present invention may also be applied to closed shapes such as circles. Since such shapes do not have end regions as do lines, only that portion of the invention which relates to the middle region of a line is applicable.

While particular embodiments of the present invention have been shown and described, it should be clear that changes and modifications may made to such embodiments without departing from the true scope and spirit of the invention. It is intended that the appended claims cover all such changes and modifications.

We claim:

1. Apparatus for drawing a line on a video display comprising a multiplicity of discrete pixels arrayed in an orthogonal coordinate system having an x-direction and a y-direction, comprising:

means for defining a line domain on the video display;

means for storing an array of pixel intensity values whose magnitudes vary as a function of distance from the line domain, a first section of which relates to a first measure of distance from said line domain and a second section of which relates to a second measure of distance from said line domain;

means for scanning a pixel location in or near said line domain;

means for determining whether the first or second measure of distance is appropriate for the pixel location;

means for determining a first index in accordance with said selected first or second measure;

means for determining a second index in accordance with said selected first or second measure;

means for selecting said portion of said storing means in accordance with said selected first or second measure;

means for applying said first and second indices to said selected portion of said storing means to output an intensity value for said pixel; and means for illuminating said pixel to the intensity value.

2. Apparatus for drawing a line on a video display comprising a multiplicity of discrete pixels arrayed in an orthogonal coordinate system having an x-direction and a y-direction, comprising:

means for defining a line on the video display in said coordinate system between first and second end points;

a line center generator for defining points between the first and second line end points;

means for storing an array of pixel intensity values whose magnitudes vary as a function of distance from a portion of the line, said storing means having a first portion storing values for pixel locations in a mid-line region and a second portion storing values for pixel locations in an end-line region;

means for determining the slope of said line;

means for scanning pixel locations within a predetermined distance of said line;

a Cartesian distance evaluator responsive to the line center generator, slope determining means, and the scanning means for determining the shorter of the distance between each pixel location and said line in either the x-direction or the y-direction;

means for determining the distance between said pixel location and one of said first or second end points in the x-direction;

means for determining the distance between said pixel location and said one of said first or second end points in the y-direction;

region evaluator means for determining whether each of said pixel locations lies in the mid-line region or the end-line region; and means responsive to the region evaluator for gating either slope and shorter distance or said x-direction end point distance and said y-direction end point distance as indices to either the first or second portion of the storing means.

* * * * *